United States Patent
Muth et al.

(10) Patent No.: US 9,330,045 B2
(45) Date of Patent: May 3, 2016

(54) CONTROLLER AREA NETWORK (CAN) DEVICE AND METHOD FOR CONTROLLING CAN TRAFFIC

(71) Applicant: NXP B.V., Eindhoven (NL)

(72) Inventors: Matthias Muth, Stelle (DE); Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 143 days.

(21) Appl. No.: 14/265,645

(22) Filed: Apr. 30, 2014

(65) Prior Publication Data
US 2015/0095532 A1 Apr. 2, 2015

Related U.S. Application Data

(63) Continuation-in-part of application No. 14/044,432, filed on Oct. 2, 2013.

(51) Int. Cl.
*G06F 3/00* (2006.01)
*G06F 13/40* (2006.01)
*H04L 12/413* (2006.01)
*H04L 12/40* (2006.01)

(52) U.S. Cl.
CPC .............. *G06F 13/4072* (2013.01); *G06F 3/00* (2013.01); *H04L 12/4135* (2013.01); *H04L 2012/40215* (2013.01)

(58) Field of Classification Search
USPC ........ 710/11, 105, 106, 305; 714/39; 370/470
See application file for complete search history.

(56) References Cited

U.S. PATENT DOCUMENTS

| | | | |
|---|---|---|---|
| 6,941,113 B2* | 9/2005 | Asano | 455/73 |
| 2004/0153870 A1* | 8/2004 | Konz et al. | 714/47 |
| 2011/0022766 A1 | 1/2011 | Beckmann et al. | |
| 2013/0290580 A1* | 10/2013 | Hartwich et al. | 710/105 |
| 2013/0294460 A1* | 11/2013 | Hell | 370/470 |
| 2014/0071995 A1* | 3/2014 | Hartwich | 370/468 |
| 2014/0156893 A1* | 6/2014 | Monroe et al. | 710/117 |
| 2014/0223258 A1* | 8/2014 | Hartwich et al. | 714/758 |

FOREIGN PATENT DOCUMENTS

| | | |
|---|---|---|
| DE | 10 2008 004 551 A1 | 7/2008 |
| EP | 2 339 778 A1 | 6/2011 |
| WO | 02/088972 A1 | 11/2002 |

OTHER PUBLICATIONS

Solutions of CAN and CAN FD in a mixed network topology, Monroe et al., Texas Instruments, 2013.*

(Continued)

*Primary Examiner* — Khanh Dang
(74) *Attorney, Agent, or Firm* — Rajeev Madnawat

(57) ABSTRACT

Embodiments of a device and method are disclosed. In an embodiment, a CAN device is disclosed. The CAN device includes a TXD input interface, a TXD output interface, an RXD input interface, an RXD output interface, and a traffic control system connected between the TXD input and output interfaces and between the RXD input and output interfaces. The traffic control system is configured to detect the presence of CAN Flexible Data-rate (FD) traffic on the RXD input interface and if the traffic control system detects the presence of CAN FD traffic on the RXD input interface, disconnect the RXD input interface from the RXD output interface and disconnect the TXD input interface from the TXD output interface.

16 Claims, 15 Drawing Sheets

(56) References Cited

OTHER PUBLICATIONS

Bosch, "CAN with Flexible Data-Rate" Specification v1.0; Apr. 17, 2012.
Bosch, CAN with Flexible Data-Rate; White Paper v1.1; 2011.
CAN Newsletter Online; "First-hand information on CAN FD"; 3 pgs; Oct. 2012.
Microchip; "High-Speed Transceiver"; MCP2551; pp. 1-22; 2003.
NXP HS-CAN transceiver TJA1145 & SBC UJA1168 for partial networking; 2 pgs.; Aug. 2011.
Texas Instruments; Introduction to the Controller Area Network (CAN); Application Report; SLOA101A; pp. 1-15; Aug. 2002—Revised Jul. 2008.
On Semiconductor; "High Speed CAN Transceiver"; AMIS-30660; Rev. 10; pp. 1-10; Aug. 2012.
ATMEL; "High-Speed CAN Transceiver"; ATA6660; pp. 1-13; Feb. 2008.
Extended European Search Report for European Patent Appln. No. 14166803.8 (Jul. 16, 2014).

\* cited by examiner

CONTROLLER AREA NETWORK (CAN) DEVICE AND METHOD FOR CONTROLLING CAN TRAFFIC

This application is a Continuation-in-part of U.S. Utility application Ser. No. 14/044,432, filed Oct. 2, 2013, entitled "Controller Area Network (CAN) transceiver and method for operating a CAN transceiver," which is incorporated by reference herein.

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," is moving towards standardization in the form of an update of the existing ISO 11898-1 standard. The emerging working draft (WD) of the ISO 11898-1 standard is described in the document, *CAN with Flexible Data-Rate*, Specification Version 1.0, released Apr. 17, 2012, and is being referred to as ISO 11898-1 WD.

In order to implement CAN FD in systems such as vehicles, all nodes in the network should be compatible with CAN FD. However, with a complex system with multiple ECUs such as an automobile, it is difficult to atomically switch all ECUs to be CAN FD compliant. Various techniques have been proposed and/or implemented to support the transition to CAN FD.

One technique involves CAN FD "passive" partial networking transceivers. Passive partial networking transceivers puts a node into a sleep or standby mode and with that "hide" the CAN FD traffic from the old CAN engines in the microcontrollers. This technique can be used, for example, for "FLASH-ing" a subset of CAN FD capable nodes in a network (e.g., in an automobile) where "old" CAN nodes are also present, but it cannot use CAN FD concurrently with old nodes during normal communication. This technique enables easy implementation and early availability. However, the technique does not support CAN FD communication during run time of the automobile and it is an island solution for software FLASH-ing during professional servicing or end of line programming.

Another technique involves using a CAN FD "active" stand-alone controller that is suitable for connection to any microcontroller. This technique involves an interface (e.g., SPI) to a CAN FD bridge and allows many ECUs to be upgraded with CAN FD by changing the protocol controller. Although this technique allows CAN FD to be run throughout an automobile, it requires hardware and software upgrades in each ECU.

Another technique involves upgrading microcontrollers with a new CAN FD block. In particular, old CAN engines would be modified to be CAN FD "silent". For this technique, the CAN IP does not need to send or receive the new CAN frame format, but "ignores" the new CAN frame format without forcing bus errors. This technique would require all microcontrollers to be upgraded, but has only a small impact on the integrated CAN IP. Although all microcontrollers must undergo a hardware and software upgrade, the network is still not able to implement network wide CAN FD.

Another technique involves developing an alternative standard. For example, there is a proposed alternative standard, referred to as CAN FD Compatible or "CAN FDC," which involves using two different bus level schemes on the bus, the conventional one for the standard CAN traffic plus an inverse level scheme for the new fast bus traffic. The inverse level scheme is simply applied by a second CAN transceiver using the opposite polarity, which is invisible for the normally connected CAN transceivers. According to this alternative standard, there might be hidden fast traffic in the background while the normal CAN nodes just see a dummy frame according to the known CAN rules. The second transceiver is connected to a new CAN engine running at a higher speed. Although this technique is backward compatible since the old CAN nodes do not recognize the fast traffic, all nodes supporting CAN FDC need new CAN protocol engines plus a second CAN transceiver.

Although various techniques have been proposed and/or implemented to support the transition to CAN FD, there is still a need for a backwards compatible solution that allows the use of CAN FD during automobile run time concurrently with "old" CAN.

Embodiments of a device and method are disclosed. In an embodiment, a CAN device is disclosed. The CAN device includes a TXD input interface, a TXD output interface, an RXD input interface, an RXD output interface, and a traffic control system connected between the TXD input and output interfaces and between the RXD input and output interfaces. The traffic control system is configured to detect the presence of CAN Flexible Data-rate (FD) traffic on the RXD input interface and if the traffic control system detects the presence of CAN FD traffic on the RXD input interface, disconnect the RXD input interface from the RXD output interface and disconnect the TXD input interface from the TXD output interface.

In another embodiment, a method for controlling CAN traffic is disclosed. The method involves decoding traffic received on an RXD input interface, monitoring the decoded traffic for the presence of CAN FD traffic, and if the presence of CAN FD traffic is detected on the RXD input interface, then disconnecting the RXD input interface from an RXD output interface and disconnecting a TXD input interface from a TXD output interface.

Other aspects in accordance with the invention will become apparent from the following detailed description, taken in conjunction with the accompanying drawings, illustrated by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
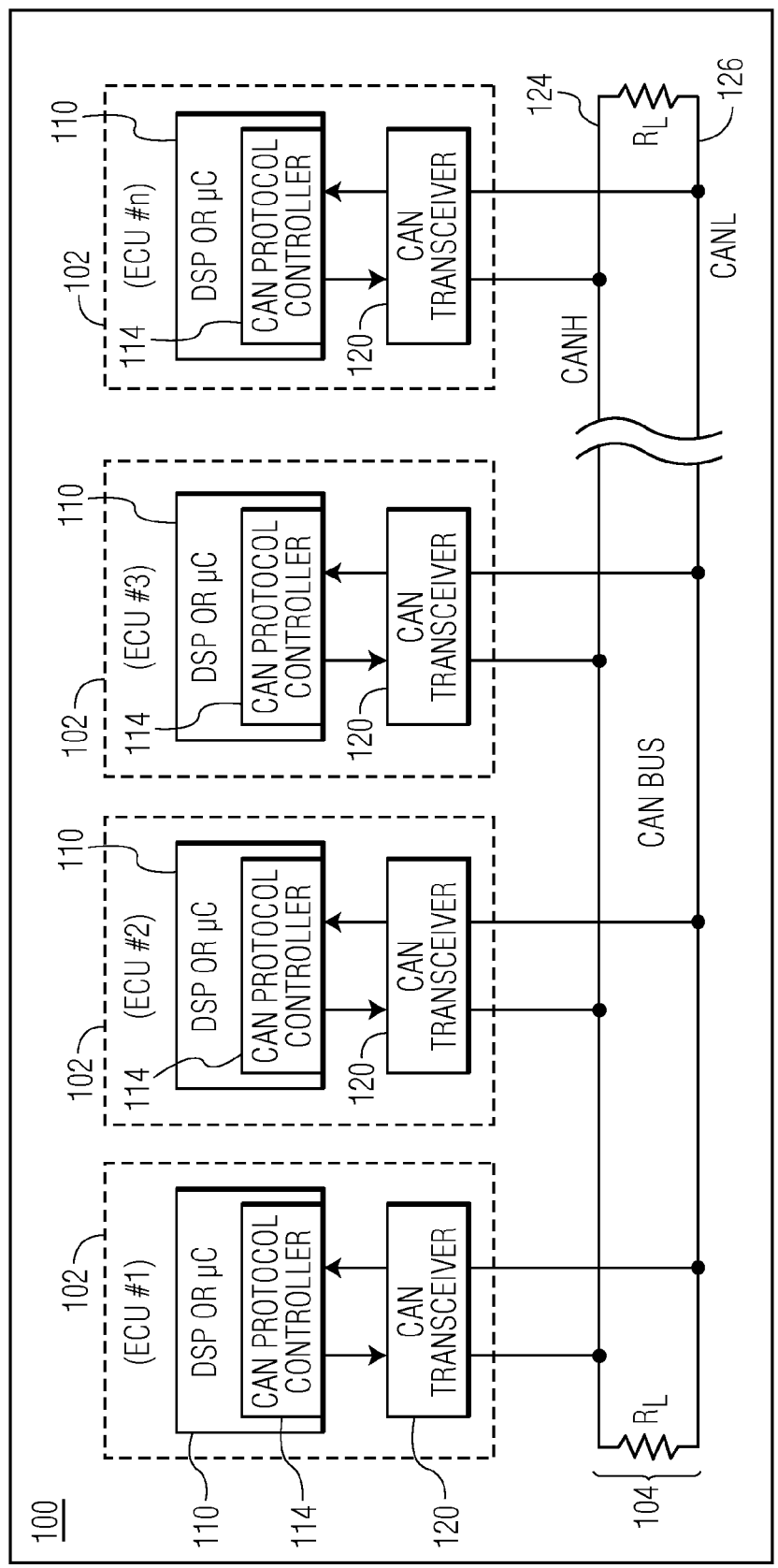
FIG. 1 depicts a CAN network that includes multiple electronic control units (ECUs), each connected to a CAN bus.

FIG. 1 depicts a CAN network 100 that includes multiple ECUs 102, also referred to as "nodes," each connected to a CAN bus 104. In the embodiment of FIG. 1, each ECU includes a microcontroller 110 having an embedded CAN protocol controller 114 and a CAN transceiver 120. The microcontrollers are typically connected to at least one device such as a sensor, an actuator, or some other control device and are programmed to determine the meaning of received messages and to generate appropriate outgoing messages. The microcontrollers, also referred to as host processors or digital signal processors (DSPs), are known in the field.

The CAN protocol controllers 114, which can be embedded within the microcontrollers 110 or external to the microcontrollers, implement data link layer operations as is known in the field. For example, in receive operations, a CAN protocol controller stores received serial bits from the transceiver until an entire message is available for fetching by the microcontroller. The CAN protocol controller can also decode the CAN frames according to the standardized frame format. In transmit operations, the CAN protocol controller receives messages from the microcontroller and transmits the messages as serial bits in CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
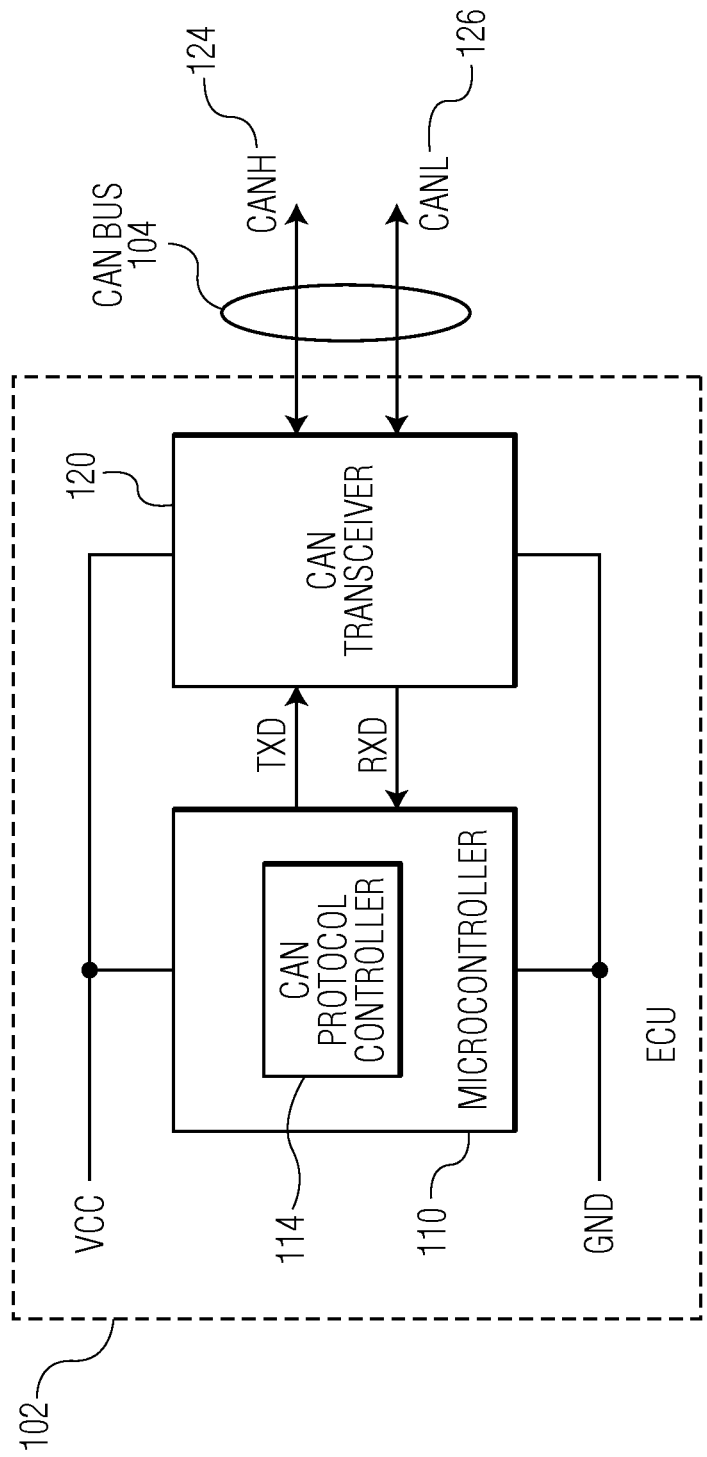
FIG. 2 depicts an expanded view of one ECU from FIG. 1.

FIG. 2 depicts an expanded view of one ECU 102 from FIG. 1. The microcontroller 110 and the CAN transceiver 120 of the ECU are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Data is communicated to and from the CAN bus via the CANH and CANL bus lines 124 and 126, respectively.

As noted above, the CAN protocol controller can be configured to support the normal mode or the flexible data rate mode. As used herein, "CAN normal mode" (also referred to as "CAN classic mode") refers to frames that are formatted according to the ISO 11898-1 standard and "CAN FD mode" refers to frames that are formatted according to the emerging ISO 11898-1 WD standard, or an equivalent thereof. The emerging ISO 11898-1 WD standard is described in the document, *CAN with Flexible Data-Rate*, Specification Version 1.0, released Apr. 17, 2012, which is incorporated by reference herein.

Figure 3A:
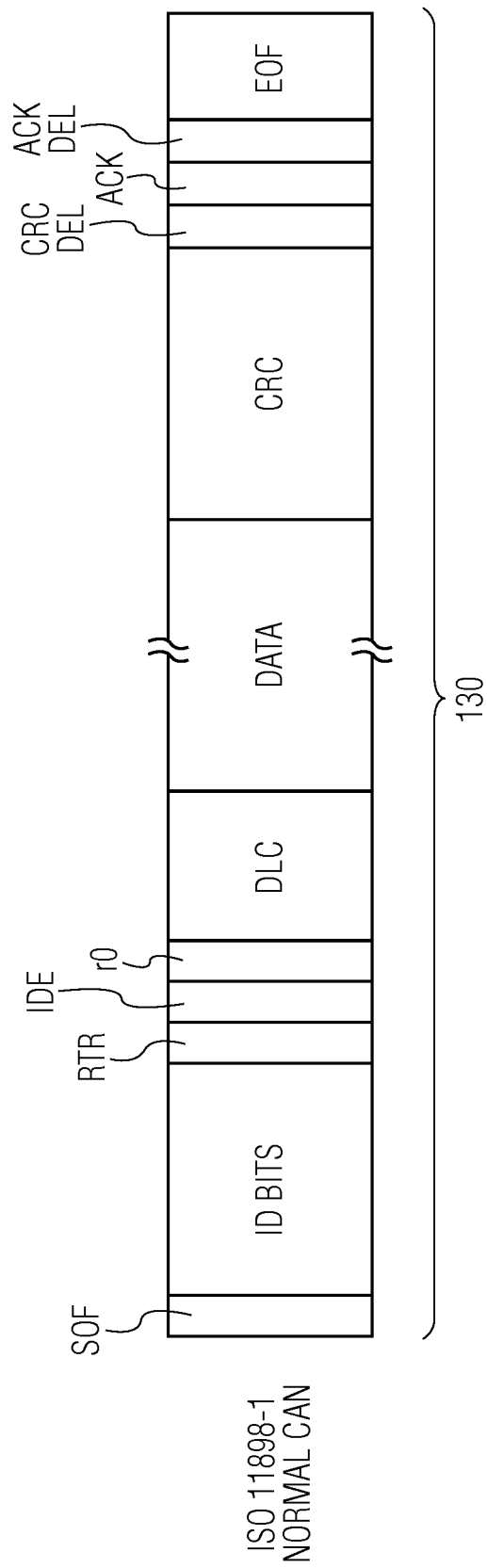
FIG. 3A depicts the format of an ISO 11898-1 frame that is used in CAN normal mode.
Figure 3B:
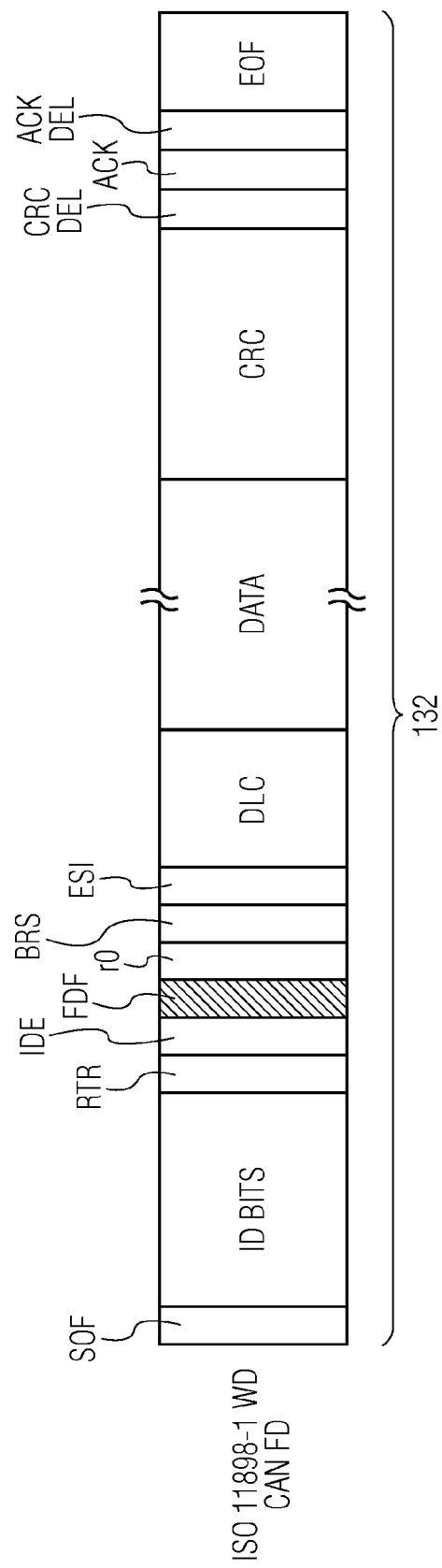
FIG. 3B depicts the format of an ISO 11898-1 WD frame that is used in CAN FD mode.

FIG. 3A depicts the format of an ISO 11898-1 frame 130 (in the classic base frame format (CBFF)) that is used in CAN normal mode and FIG. 3B depicts the format of an ISO 11898-1 WD frame 132 (in the FD base frame format) that is used in CAN FD mode. The fields of the CAN normal mode and CAN FD mode frames are defined as follows:
SOF Start of Frame (always dominant)
ID Bits Identifier Bits, defining the message content
RTR Remote transmission Request
IDE ID Extension
r0 Reserved Bit 0 (replaced by FDF in the CAN FD format)
FDF FD Format (this is the bit distinguishing the frame formats)
BRS Baud Rate Switch
ESI Error State Indicator
DLC Data Length Code
Data Data Bytes
CRC Cyclic Redundancy Check
CRC Del CRC Delimiter (always recessive)
ACK Acknowledge
ACK Del Acknowledge Delimiter
EOF End Of Frame There is also another version of the classic format, referred to as "classic extended frame format (CEFF)," in which the FDF bit is in the old r1 position, whereas the FDF bit is in the r0 position in CBFF. Of note, the CAN protocols use the reserved bit (r0 or r1) (also referred to generally as the FDF bit) within a CAN normal mode frame to identify a frame as a CAN FD mode frame. In particular, the FDF bit is a 1-bit field that indicates whether the frame is a CAN normal mode frame (ISO 11898-1) or a CAN FD mode frame (ISO 11898-1 WD). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

As described above, in order for an ECU to support CAN FD mode, the CAN protocol controller must support CAN FD mode. If the CAN protocol controller does not support CAN FD mode but receives a CAN FD mode frame, then the CAN protocol controller will not recognize the frame and will likely enter an error state, which typically causes the CAN protocol controller to output an error signal on the CAN bus. However, it is desirable to have a node that only supports CAN normal mode coexist on the same CAN bus as nodes that support CAN FD mode. In accordance with an embodiment of the invention, a CAN transceiver of an ECU in a CAN is configured to detect the presence of CAN FD mode traffic and to implement a change in an operating state of the CAN transceiver, such as disconnecting the CAN protocol controller of the ECU from the CAN bus, if CAN FD mode traffic is detected. Implementing a change in an operating state of the CAN transceiver, such as disconnecting the CAN protocol controller from the CAN bus, when CAN FD mode traffic is detected, prevents the CAN protocol controller 114 at the microcontroller 110 from passing an error signal to the CAN bus in response to a CAN FD mode frame and therefore allows a normal mode CAN protocol controller to coexist on the same CAN bus with FD mode CAN protocol controllers.

In one embodiment, changing an operation state of the CAN transceiver involves disconnecting the transmit data (TXD) from the CAN bus to prevent the transmission of error signals onto the CAN bus and in another embodiment, changing an operation state of the CAN transceiver involves disconnecting the receive data (RXD) from the CAN protocol controller of the ECU to prevent CAN FD mode frames from reaching the CAN protocol controller. When the end of a CAN FD mode frame is detected (e.g., as indicated by the Acknowledge slot, which is the bit after the CRC delimiter (CRC DEL)), the CAN transceiver can reconnect the CAN protocol controller of the ECU to the CAN bus.

In a further embodiment, when CAN FD mode frames are detected, the CAN transceiver generates one or more dummy frames that are compatible with the CAN normal mode and provides the dummy frames to the CAN protocol controller to keep the CAN protocol controller from entering an error state. Once the end of an FD mode frame is detected, the CAN transceiver can cease generation of the dummy frames.

Figure 4:
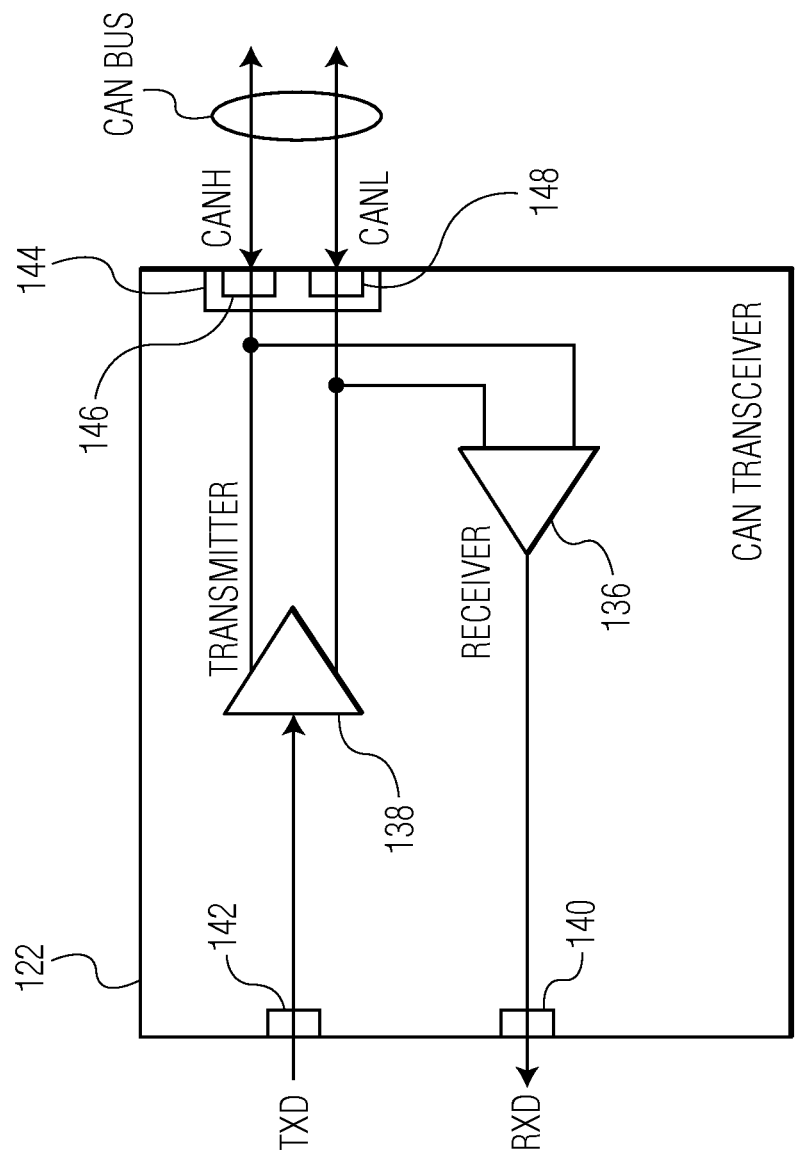
FIG. 4 depicts an embodiment of a conventional CAN transceiver that includes a receiver, a transmitter, a receive data (RXD) interface, a transmit data (TXD) interface, and a CAN bus interface.

A conventional CAN transceiver is not able to detect the type of frames that are being received on the CAN bus and therefore cannot selectively control its own operating state in response to the type of frames that are received. FIG. 4 depicts an embodiment of a conventional CAN transceiver 122 that includes a receiver 136, a transmitter 138, an RXD interface 140, a TXD interface 142, and a CAN bus interface 144 having a CANH bus interface 146 and a CANL bus interface 148. CAN traffic (e.g., RXD) that is received at the CAN bus interface is simply passed to the RXD interface via the receiver and CAN traffic (e.g., TXD) that is received at the TXD interface is simply transmitted out the CAN bus interface via the transmitter. Because the CAN transceiver has no ability to detect the type of frames being received, the CAN traffic is passed through the CAN transceiver without regard to whether the frames are CAN normal mode or CAN FD mode frames.

Figure 5A:
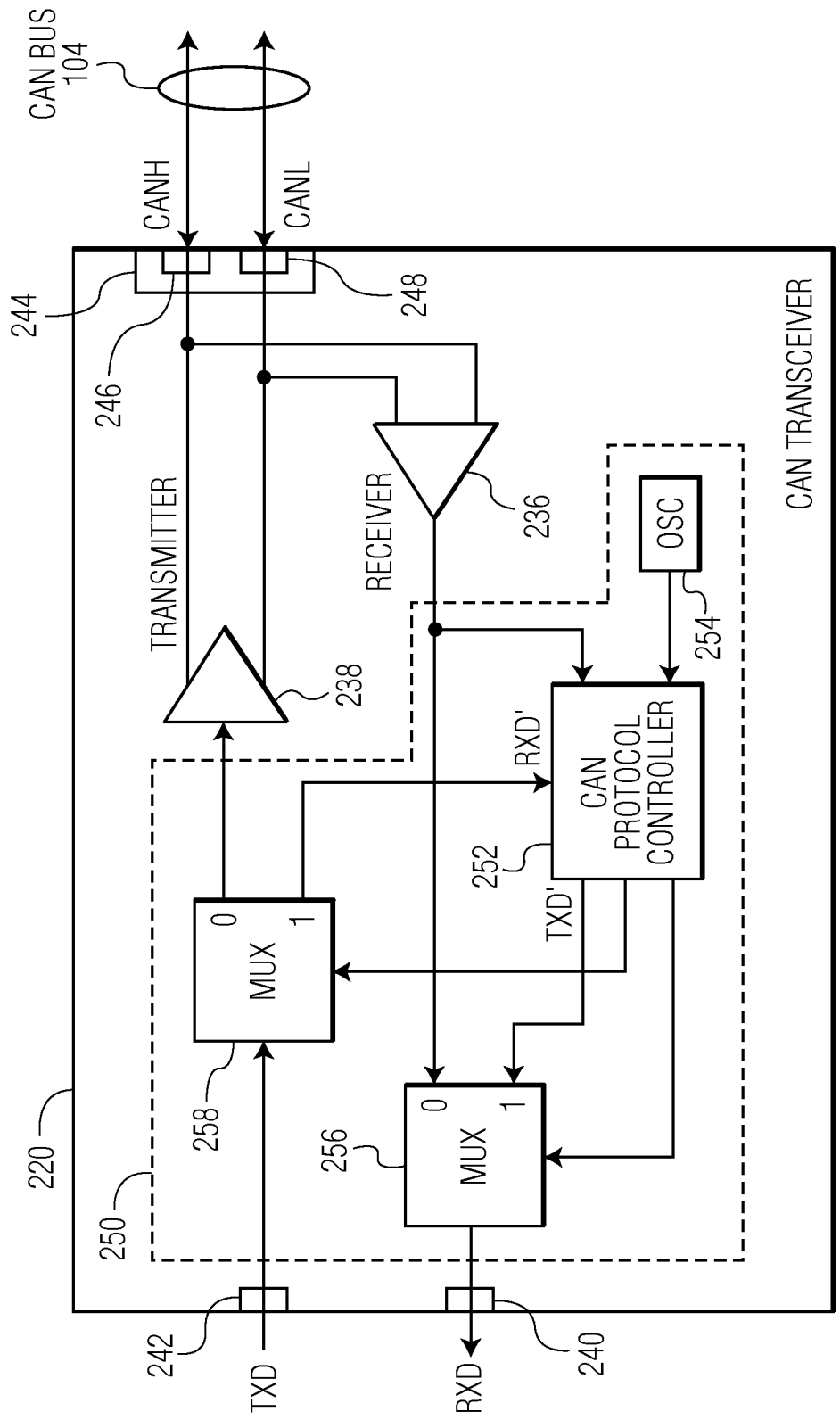
FIG. 5A depicts an embodiment of a CAN transceiver that is configured to detect the presence of CAN FD mode traffic and to implement a change in an operating state of the CAN transceiver, if CAN FD mode traffic is detected.

FIG. 5A depicts an embodiment of a CAN transceiver 220 that is configured to detect the presence of CAN FD mode traffic and to implement a change in an operating state of the CAN transceiver, such as disconnecting the CAN protocol controller 114 at the microcontroller 110 from the CAN bus 104, if CAN FD mode traffic is detected. The CAN transceiver includes an RXD interface 240, a TXD interface 242, a CAN bus interface 244 (having a CANH bus interface 246 and a CANL bus interface 248), a receiver 236, a transmitter 238, and a traffic control system 250 that includes its own CAN protocol controller 252 (which is able to decode CAN FD frames) and a switching system that allows the TXD interface 242 and the RXD interface 240 to be independently disconnected from the CAN bus interface, thereby disconnecting the CAN protocol controller at the microcontroller 110 from the CAN bus 104. In the embodiment of FIG. 5A, the traffic control system includes the CAN protocol controller 252, an oscillator 254, a receive path multiplexer 256, and a transmit path multiplexer 258. The CAN protocol controller 252 is connected to receive serial digital data from the receiver, timing signals from the oscillator, and serial digital data from the TXD interface (identified as RXD'). The CAN protocol controller 252 is connected to output serial digital data (identified as TXD') to the receive path multiplexer and to output multiplexer control signals (CAN_FD Detected_TXD, CAN_Normal_Dectected_TXD, CAN_FD_Detected_RXD, and CAN_Normal_Dectected_RXD) to the receive path multiplexer and/or to the transmit path multiplexer. The receive path multiplexer is connected to receive serial digital data directly from the receiver and from the CAN protocol controller and to output serial digital data to the RXD interface from either the CAN protocol controller or directly from the receiver depending on the state of the RXD multiplexer control signal (e.g., CAN_FD_Detected_RXD or CAN_Normal_Dectected_RXD). The transmit path multiplexer is connected to receive serial digital data from the TXD interface and to output serial digital data to either the transmitter or to the CAN protocol controller 252 depending on the state of the TXD multiplexer control signal (e.g., CAN_FD_Detected_TXD or CAN_Normal_Dectected_TXD).

Figure 5B:
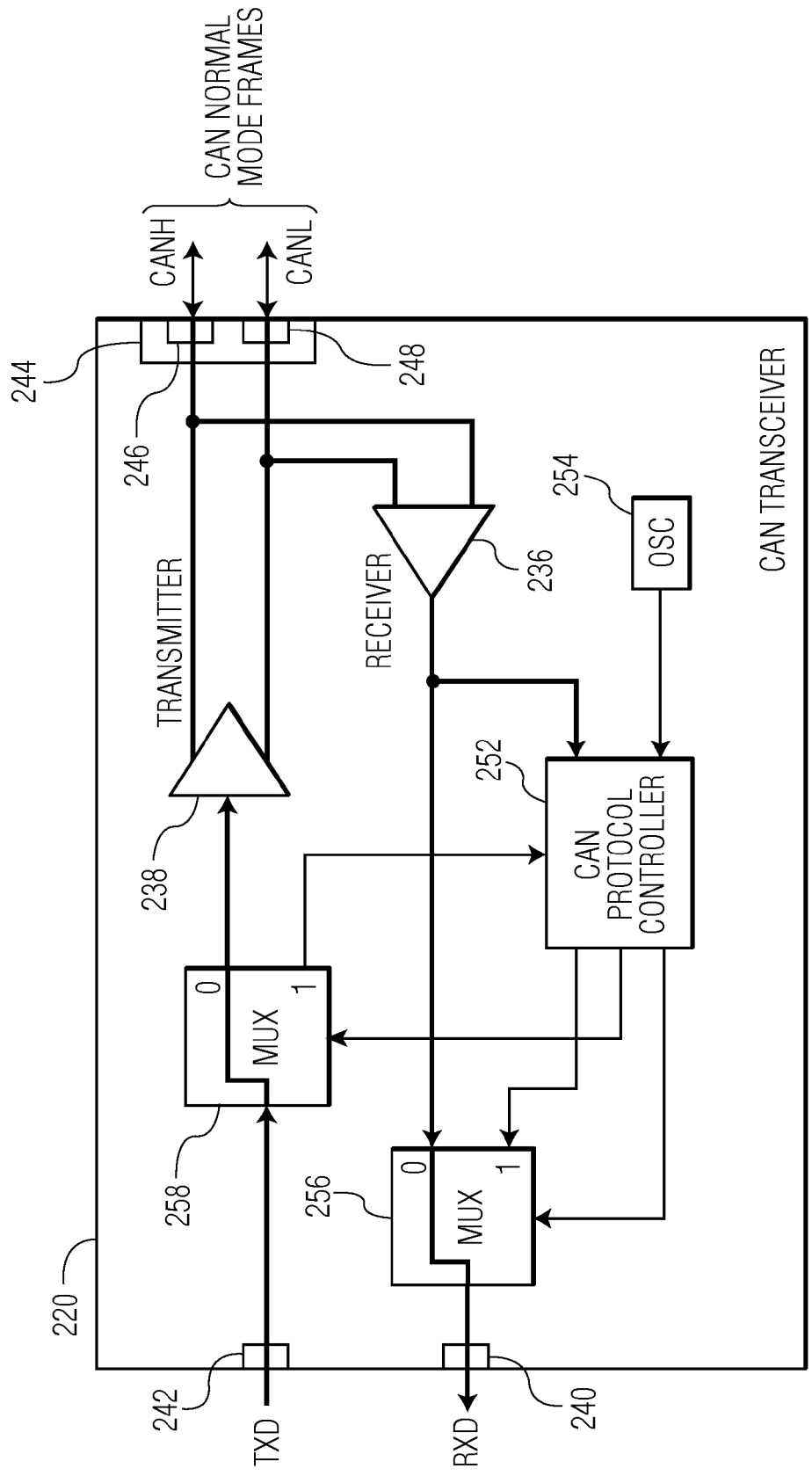
FIG. 5B illustrates an operational case of the CAN transceiver of FIG. 5A in which CAN normal mode traffic is received at the CAN bus.
Figure 5C:
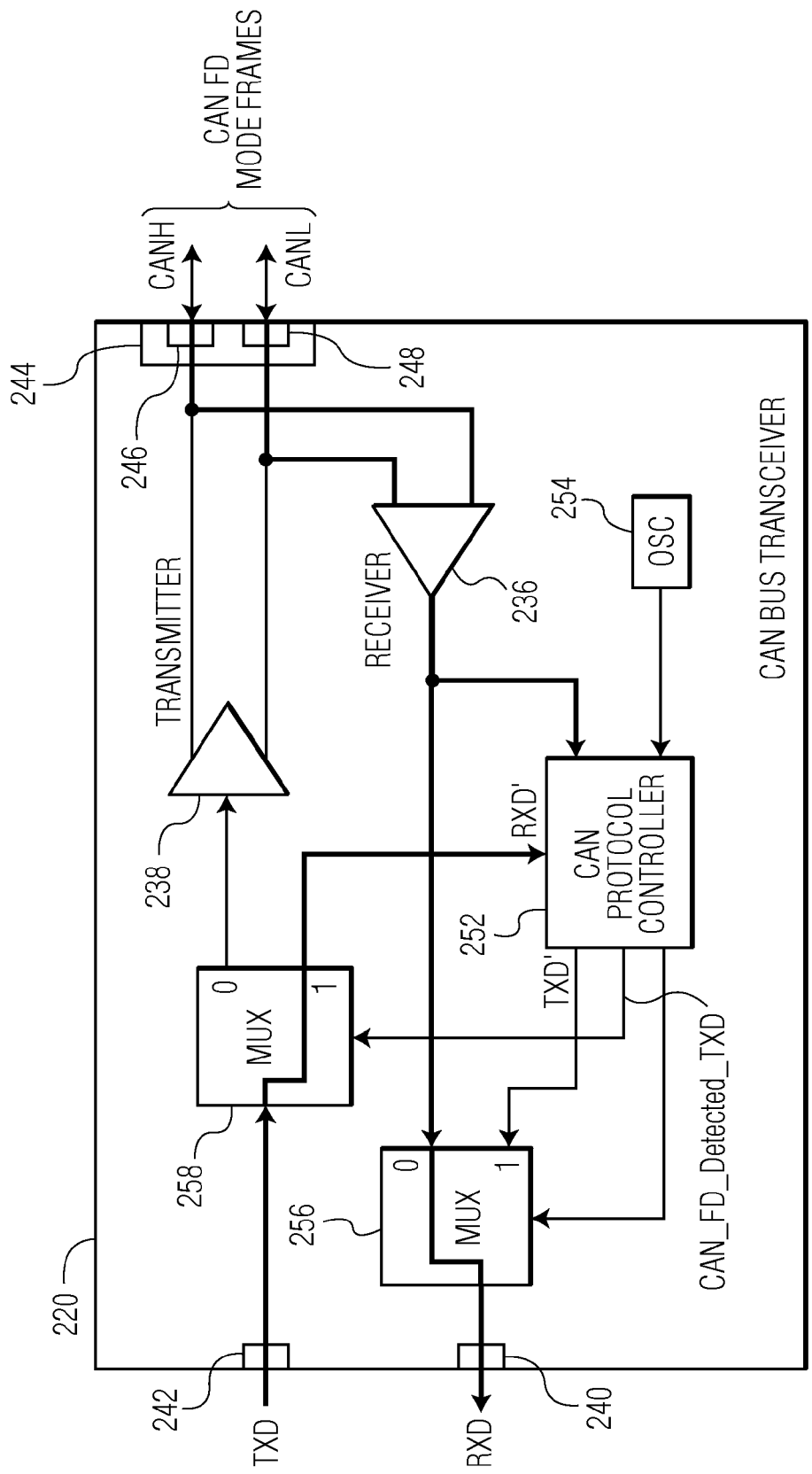
FIG. 5C illustrates an operational case of the CAN transceiver of FIG. 5A in which CAN FD mode traffic is received at the CAN bus and only the TXD interface is disconnected from the CAN bus.
Figure 5D:
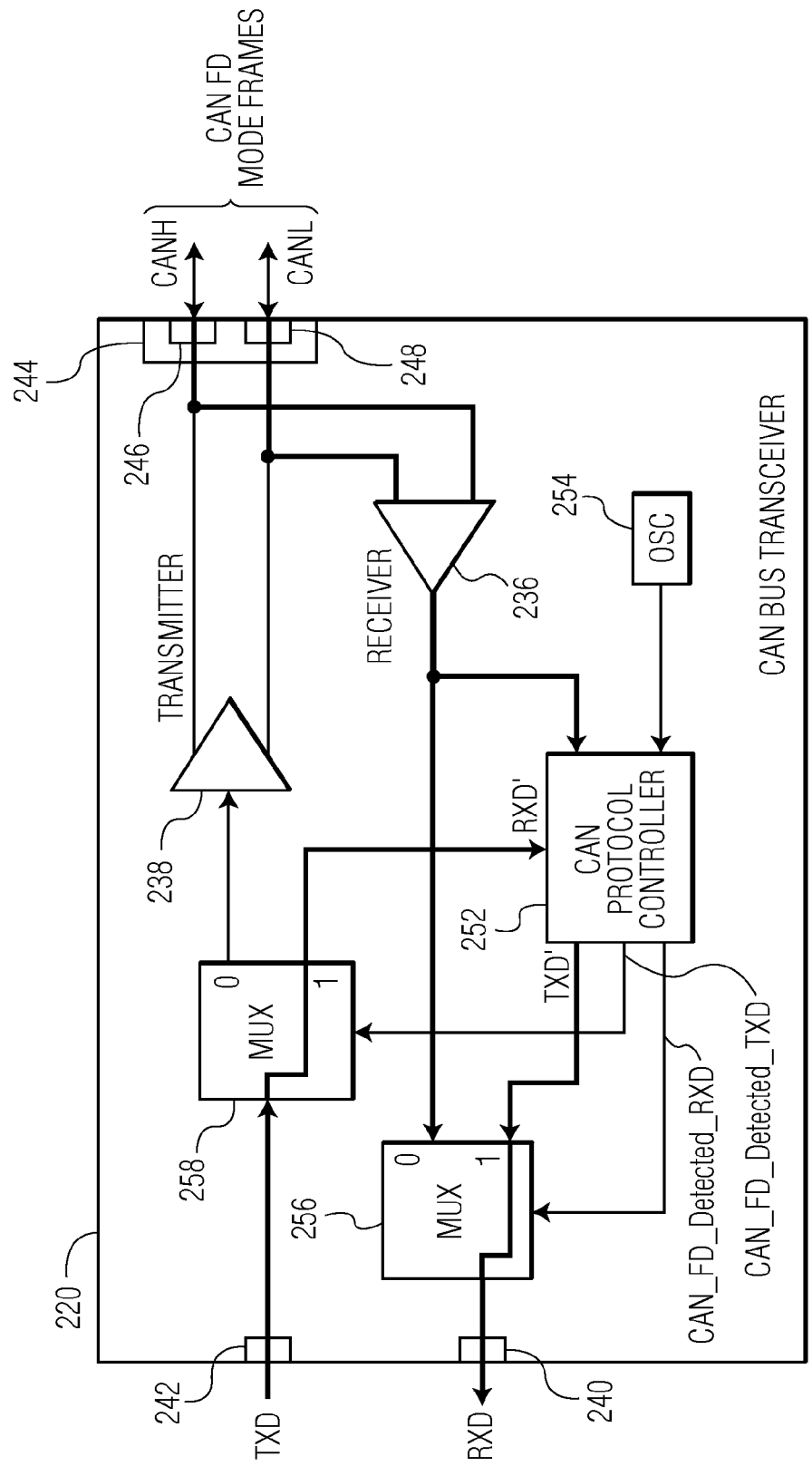
FIG. 5D illustrates an operational case of the CAN transceiver of FIG. 5A in which CAN FD mode traffic is received at the CAN bus and both the TXD interface and the RXD interface are disconnected from the CAN bus.

Operation of the transceiver of FIG. 5A is now described with reference to FIGS. 5B-5D. FIG. 5B illustrates the case in which CAN normal mode frames are received at the CAN bus 104 and FIGS. 5C and 5D illustrate cases in which CAN FD mode frames are received at the CAN bus. In FIGS. 5B-5D, the dark lines indicate active data paths, e.g., channels on which data is being communicated. In the operational examples of FIGS. 5B-5D, it is presumed that the CAN transceiver 220 is connected to a microcontroller 110 that has a CAN protocol controller 114 that is only able to support CAN normal mode. That is, the microcontroller that is connected to the CAN transceiver expects to see only CAN normal mode traffic and is not even able to identify CAN FD mode traffic.

With reference to FIG. 5B, at least one CAN normal mode frame is transmitted on the CAN bus 104. The CAN normal mode frame is received by the receiver 236 and converted from differential signals to corresponding serial signals. The serial signals are provided to the CAN protocol controller 252 and to the RXD interface 240 via the receive path multiplexer 256. While the serial signals are provided to the RXD interface, the CAN protocol controller decodes the serial signals to determine if the received frame is a CAN normal mode frame or a CAN FD mode frame. In particular, the CAN protocol controller reads the FDF bit to determine the type of frame. In this embodiment, the CAN protocol controller 252 of the CAN transceiver 220 is able to distinguish between CAN normal mode frames and CAN FD mode frames as opposed to the CAN protocol controller 114 of the microcontroller 110, which is not able to distinguish between CAN normal mode frames and CAN FD mode frames. Since the received frame is a normal mode frame, the transmit path multiplexer 258 is controlled to pass serial digital signals from the TXD interface directly to the transmitter 238. The transmitter then converts the digital signals to analog differential signals that are transmitted on the CAN bus 104. Additionally, since the received frame is a normal mode frame, the receive path multiplexer is controlled to pass the serial signals directly from the receiver to the RXD interface via the receive path multiplexer, effectively bypassing the CAN protocol controller 252 from the perspective of the RXD interface 240. For example, the receiver converts the analog differential signals to serial single-line digital signals and transmits the digital signals to the corresponding microcontroller 110 of an ECU 102 via the RXD interface 240. In an embodiment, the CAN protocol controller outputs CAN_Normal Detected_TXD and CAN_Normal Detected_RXD signals to the receive path multiplexer 256 and to the transmit path multiplexer 258, respectively, to control the multiplexers to enable data communications paths as illustrated in FIG. 5B. In the example of FIG. 5B, the CAN protocol controller 114 at the microcontroller 110 expects to see CAN normal mode frames and does indeed see such frames. Therefore, the CAN protocol controller 114 at the microcontroller 110 is able to correctly interpret the data frames.

With reference to FIG. 5C, at least one CAN FD mode frame is transmitted on the CAN bus 104. The CAN FD mode frame is received by the receiver 236 and converted from analog differential signals to corresponding serial digital signals. The serial digital signals are provided to the CAN protocol controller 252 and to the RXD interface 240 via the receive path multiplexer 256 and initially, the first few bits of data are passed directly from the receiver to the RXD via the receive path multiplexer (not shown in FIG. 5C). While the serial signals are provided to the RXD interface, the CAN protocol controller 252 of the CAN transceiver 220 decodes the serial signals to determine if the received frame is a CAN normal mode frame or a CAN FD mode frame. In particular, the CAN protocol controller reads the FDF bit in an "on the fly" operation to determine the type of frame. As described above, the CAN protocol controller of the CAN transceiver 220 is able to distinguish between CAN normal mode frames and CAN FD mode frames and since the received frame is an FD mode frame, an operating state of the CAN transceiver is changed. For example, the CAN protocol controller immediately changes an operation state of the CAN transceiver to disconnect the CAN bus interface from the TXD interface to prevent the transmission of error signals onto the CAN bus. In an embodiment, the CAN protocol controller asserts the CAN_FD_Detected_TXD signal to cause the transmit path multiplexer to direct the transmit data, TXD, from the TXD interface to the CAN protocol controller 252 instead of to the transmitter 238. In this case, the CAN FD mode frames are passed to the microcontroller 110 via the RXD interface 240. However, because the TXD interface is disconnected from the CAN bus 104, any error signals that may be generated by the microcontroller do not reach the CAN bus. When the end of an FD mode transmission is reached, the CAN transceiver can reconnect the TXD and RXD interfaces of the transceiver to the CAN bus interface. In an embodiment, the end of a CAN FD mode transmission is detected by identifying the CRC delimiter bit (CRC DEL) or when six consecutive equal bits have been detected.

With reference to FIG. 5D, at least one CAN FD mode frame is transmitted on the CAN bus 104. The CAN FD mode frame is received by the receiver 236 and converted from analog differential signals to corresponding serial digital signals. The serial digital signals are provided to the CAN protocol controller 252 and to the RXD interface 240 via the receive path multiplexer 256 and initially, the first few bits of data are passed directly from the receiver to the RXD via the receive path multiplexer (not shown in FIG. 5D). While the serial signals are provided to the RXD interface, the CAN protocol controller decodes the serial signals to determine if the received frame is a CAN normal mode frame or a CAN FD mode frame. In particular, the CAN protocol controller reads the FDF bit in an "on the fly" operation to determine the type of frame. As described above, the CAN protocol controller 252 of the CAN transceiver 220 is able to distinguish between CAN normal mode frames and CAN FD mode frames and since the received frame is an FD mode frame, an operating state of the CAN transceiver is changed. For example, the CAN protocol controller immediately changes an operation state of the CAN transceiver to disconnect the CAN bus interface from the TXD interface to prevent the transmission of error signals onto the CAN bus. In an embodiment, the CAN protocol controller asserts the CAN_FD_Detected_TXD signal to cause the transmit path multiplexer to direct the transmit data TXD from the TXD interface to the CAN protocol controller instead of to the transmitter. Additionally, immediately upon detecting that the received frame is a CAN FD mode frame, the CAN protocol controller changes an operation state of the CAN transceiver to disconnect the CAN bus interface from the RXD interface to prevent CAN FD mode frames from reaching the CAN protocol controller 114 of an ECU 102. For example, the CAN protocol controller 252 in the CAN transceiver 220 asserts the CAN_FD_Detected_RXD signal to cause the receive path multiplexer 256 to select data from the CAN protocol controller (TXD') for output to the RXD interface 240 instead of data received directly from the CAN bus. Once the end of the last FD mode frame is reached (e.g., as indicated by the CRC DEL bit), the CAN transceiver can reconnect the TXD and RXD interfaces of the transceiver to the CAN bus interface as illustrated in FIG. 5B.

In a further embodiment, when CAN FD mode frames are detected by the CAN protocol controller 252 of the CAN transceiver 220, the CAN protocol controller 252 generates dummy frames that are compatible with the CAN normal mode and provides the dummy frames to the RXD interface (and ultimately to the CAN protocol controller 114 at the microcontroller 110) to keep the CAN protocol controller 114 at the microcontroller 110 from entering an error state. In an embodiment, the CAN protocol controller 252 of the CAN transceiver 220 generates and outputs an ISO tolerant bit pattern, for example, a bit pattern of dominant state bits (e.g., logical low) for as long as there is still a CAN FD mode frame on the CAN bus. Such a bit pattern may exceed the bit pattern of an ISO 11898-1 ERROR frame (e.g., six consecutive dominant bits) but the bit pattern is still tolerated by a CAN protocol controller that is compliant with ISO 11898-1. In an embodiment, the bit pattern that is generated and sent by the CAN protocol controller 252 while a CAN FD mode frame is being received causes the corresponding CAN protocol controller 114 of an ECU 110 (FIG. 1) to wait for the next idle phase and to participate in the next arbitration phase. In an embodiment, when RXD is clamped dominant (e.g., logical low) by the traffic control system 250, a classic CAN protocol controller at an ECU is forced to send an error flag. ISO 11898-1 specifies that "After sending an error [or overload] flag, each node shall . . . monitor the bus until it detects a recessive bit." Accordingly, in an embodiment, a classic CAN protocol controller at an ECU will wait until a CAN FD frame ends, effectively "pausing" the classic CAN protocol controller during a CAN FD frame transmission in the CAN network. Once the end of an FD mode frame is reached, the CAN protocol controller 252 at the CAN transceiver 220 can cease generation of the dummy frames. In an embodiment, the traffic control system 250 is switched to the state described with reference to FIG. 5B immediately upon completion of a CAN FD mode frame transmission. For example, once the CAN protocol controller 252 detects the end of a CAN FD mode frame (e.g., upon detecting the CRC DEL bit), the CAN protocol controller 252 outputs CAN_Normal Detected_TXD and CAN_Normal Detected_RXD signals to the receive path multiplexer 256 and to the transmit path multiplexer 258, respectively, to control the multiplexers to enable data communications paths as illustrated in FIG. 5B. In the example of FIG. 5B, the CAN protocol controller 114 at the microcontroller 110 expects to see CAN normal mode frames and does indeed see such frames. Therefore, the CAN protocol controller 114 at the microcontroller 110 is able to correctly interpret the data frames. In an embodiment, by releasing RXD back to the actual CAN bus signal after the CRC delimiter, a classic CAN protocol controller and CAN FD controllers in a CAN network reach the "intermission slot" (see ISO 11898-1, section on "Specification of inter-frame space") at the same point in time, thus allowing all of the CAN protocol controllers to arbitrate amongst each other for the next frame transmission.

In an embodiment, the CAN protocol controller 252 of the CAN transceiver 220 simultaneously outputs the CAN_FD_Detected_RXD signal to the receive path multiplexer 256 and the CAN_FD_Detected_TXD to the transmit path multiplexer 258 to control the multiplexers to enable the data communications paths as illustrated in FIG. 5D. In the example of FIG. 5D, the CAN protocol controller 114 at the microcontroller 110 expects to see a CAN normal mode frame and does indeed see such a frame even though the CAN bus is actually receiving a CAN FD frame. In effect, the CAN transceiver hides the CAN FD traffic from the CAN protocol controller 114 at the microcontroller 110. Therefore, the CAN protocol controller 114 at the microcontroller 110 is able to correctly interpret the data frame and does not enter an error state.

In some cases, it is desirable to ensure that the microcontroller 110 does not start transmitting a frame too early, e.g., while a received CAN FD frame is still running on the CAN bus. In an embodiment, the CAN protocol controller 252 of the CAN transceiver 220 is configured to generate "CAN Overload Frames" and to output the frames to the microcontroller 110 via the RXD interface 240. These Overload Frames are defined within the ISO 11898-1 standard as a measure to block a node from transmitting without causing error conditions. With that in place the microcontroller might be "parked" until the bus is free again for bus transmissions.

Figure 6:
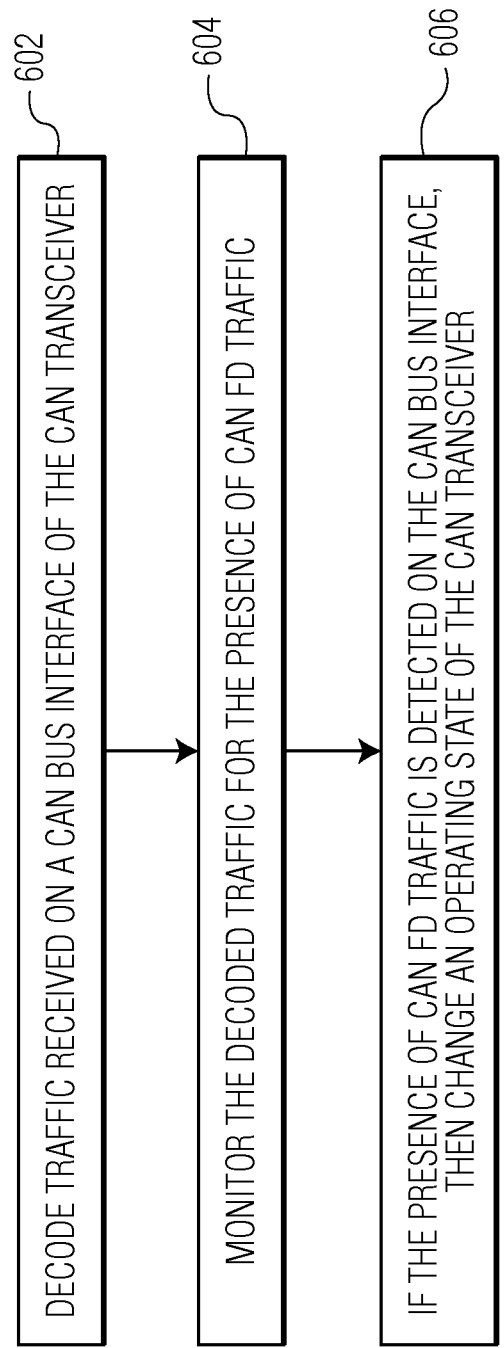
FIG. 6 is a process flow diagram of a method for operating a CAN transceiver in accordance with an embodiment of the invention.

FIG. 6 is a process flow diagram of a method for operating a CAN transceiver in accordance with an embodiment of the invention. At block 602, traffic received on a CAN bus interface of the CAN transceiver is decoded. At block 604, the decoded traffic is monitored for the presence of CAN FD traffic. At block 606, if the presence of CAN FD traffic is detected on the CAN bus interface, then an operating state of the CAN transceiver is changed.

In an embodiment, the above described operation states can be implemented individually or in combination. For example, in one embodiment, only the TXD interface is disconnected from the CAN bus and in another embodiment, both the TXD and RXD interfaces are disconnected from the CAN bus interface, and in anther embodiment, both the TXD and RXD interfaces are disconnected from the CAN bus interface and dummy frames are generated by the CAN protocol controller. Additionally, although some changes in operating state are described, other changes in operating state, which are made in response to detecting a CAN FD mode frame, can be made.

In an embodiment, changing the operating state of the traffic control system 250 involves disconnecting the RXD interface from the CAN bus and forcing RXD dominant and disconnecting the TXD interface from the CAN bus and forcing TXD recessive. A description of such a technique is described below with reference to FIGS. 7A, 7B, and 8.

Figure 7A:
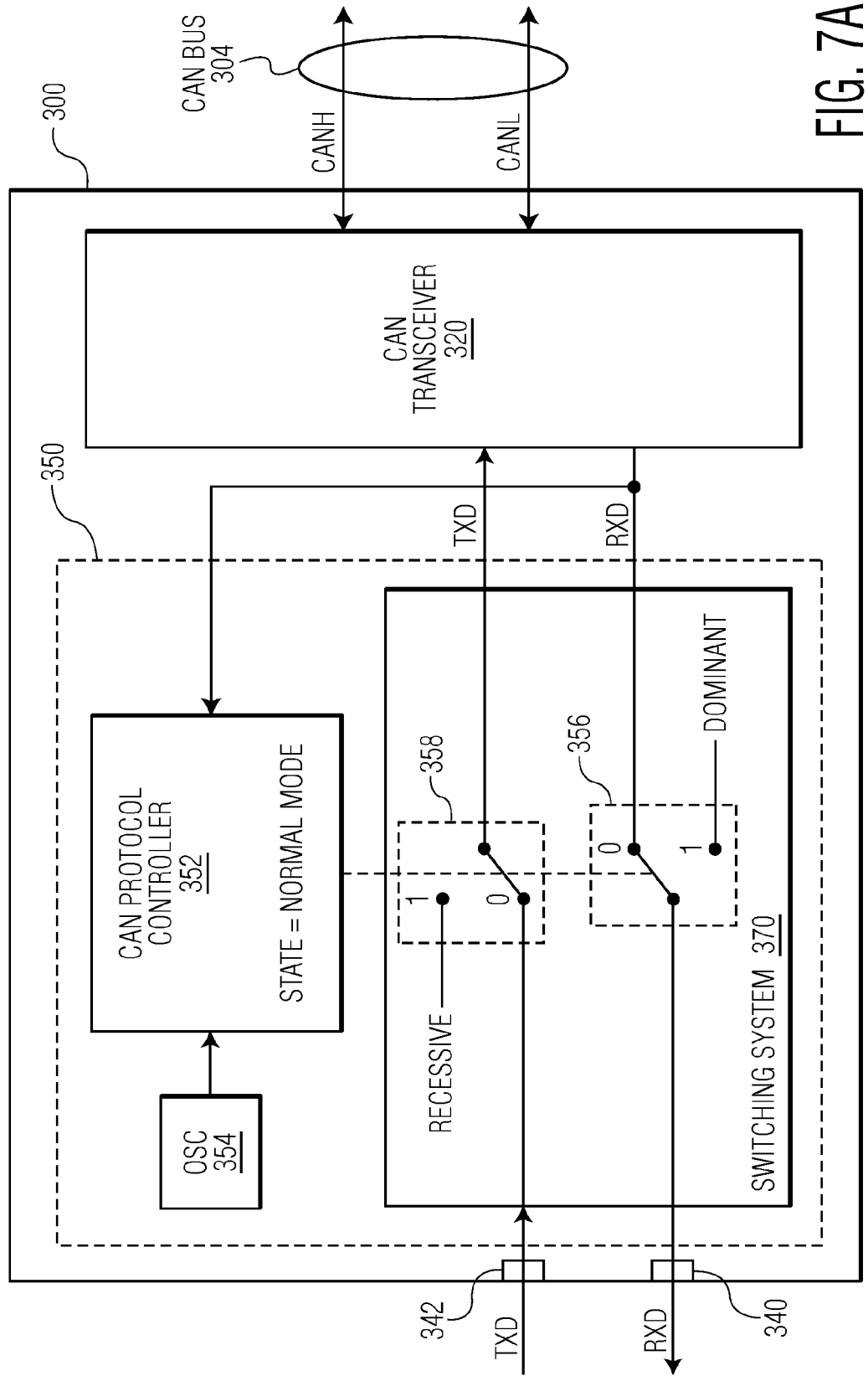
FIG. 7A depicts a CAN system that includes a CAN transceiver and a traffic control system operating in normal mode.
Figure 7B:
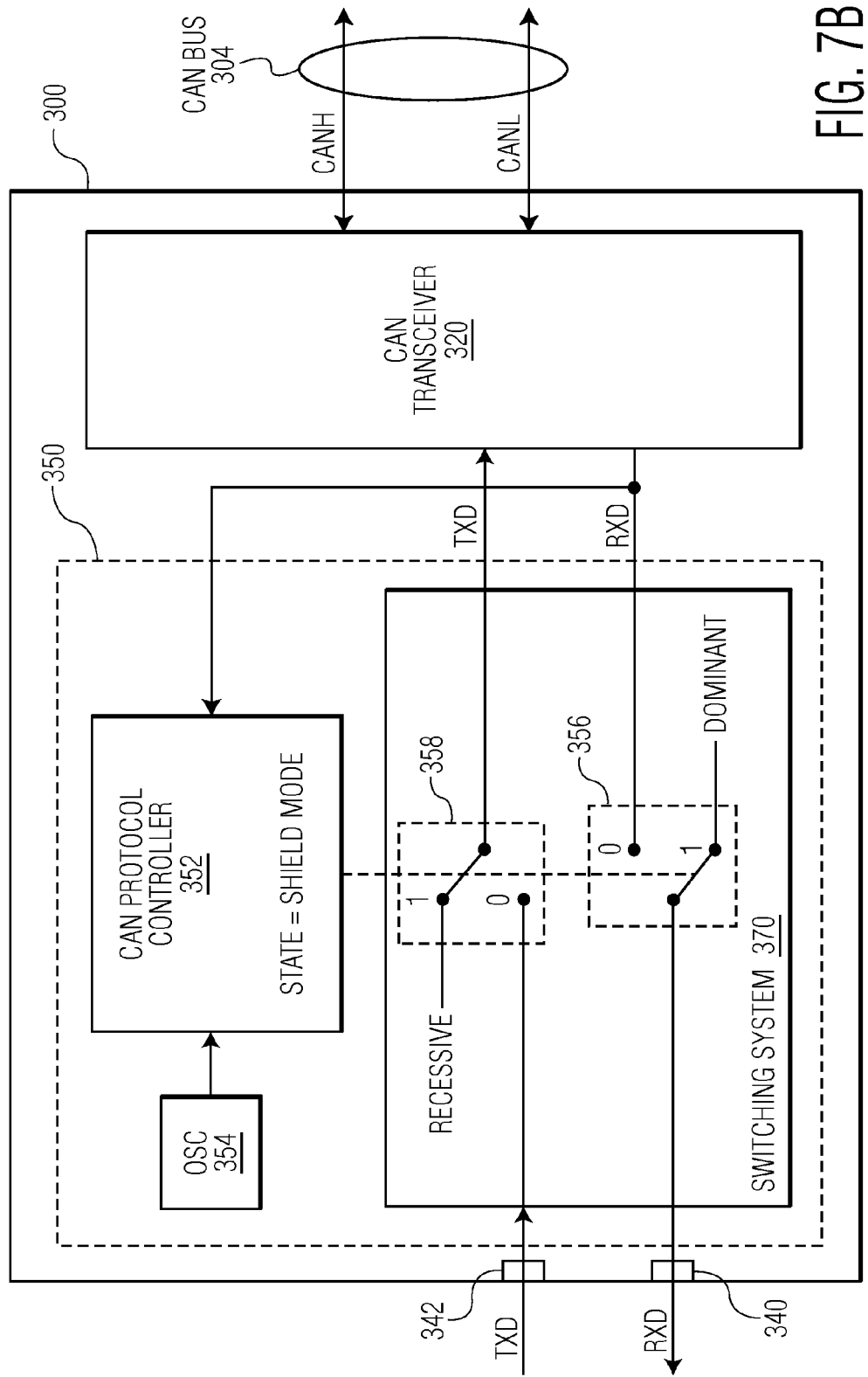
FIG. 7B depicts the CAN system of FIG. 7A operating in a shield mode.

FIG. 7A depicts a CAN system 300 that includes a CAN transceiver 320 and a traffic control system 350. The CAN transceiver 320 can be, for example, a CAN transceiver as described with reference to FIGS. 1, 2, and 4 and the traffic control system 350 can be a traffic control system similar to the traffic control system 250 described with reference to FIGS. 5A-5D. The traffic control system 350 includes a CAN protocol controller 352 (referred to herein as the "shield protocol controller"), an oscillator 354, and a switching system 370. In an embodiment, the traffic control system 350 is configured to operate in a "normal mode" when CAN classic mode frames are on the CAN bus and to operate in a "shield mode" when CAN FD mode frames are on the CAN bus. FIG. 7A illustrates a state of the switching system 370 when the traffic control system is operating in the normal mode and FIG. 7B illustrates a state of the switching system when the traffic control system is operating in the shield mode.

With reference to FIG. 7A, when operating in the normal mode, the RXD from the CAN transceiver 320 is connected to the RXD interface 340 so that the signal on the CAN bus 304 is passed directly to a CAN protocol controller 114 at an ECU 102 and the TXD from the TXD interface 342 is connected to the CAN transceiver 320 so that the TXD from the CAN protocol controller 114 at the ECU 102 is passed directly to the CAN transceiver 320 and ultimately to the CAN bus 304. For example, in the normal mode, a receive path multiplexer 356 of the switching system 370 is set to state "0" and a transmit path multiplexer 358 of the switching system 370 is set to state "0."

In an embodiment, upon detection of a CAN FD frame on the CAN bus 304 by the shield protocol controller 352, the traffic control system 350 switches to the shield mode. With reference to FIG. 7B, when operating in the shield mode, the RXD from the CAN transceiver 320 is disconnected from the RXD interface 340 so that the signal on the CAN bus 304 is not passed to a CAN protocol controller 114 at an ECU 102 and the TXD from the TXD interface 342 is disconnected from the CAN transceiver 320 so that the TXD is not passed to the CAN bus 304. For example, in the shield mode, the receive path multiplexer 356 of the switching system 370 is set to state "1" and the transmit path multiplexer 358 of the switching system 370 is set to state "1." Additionally, when the receive path multiplexer 356 is in state "1," the RXD is forced dominant (e.g., low) and when the transmit path multiplexer is in state "1," a recessive TXD (e.g., high) is output to the CAN transceiver 320 and ultimately to the CAN bus 304.

Figure 8:
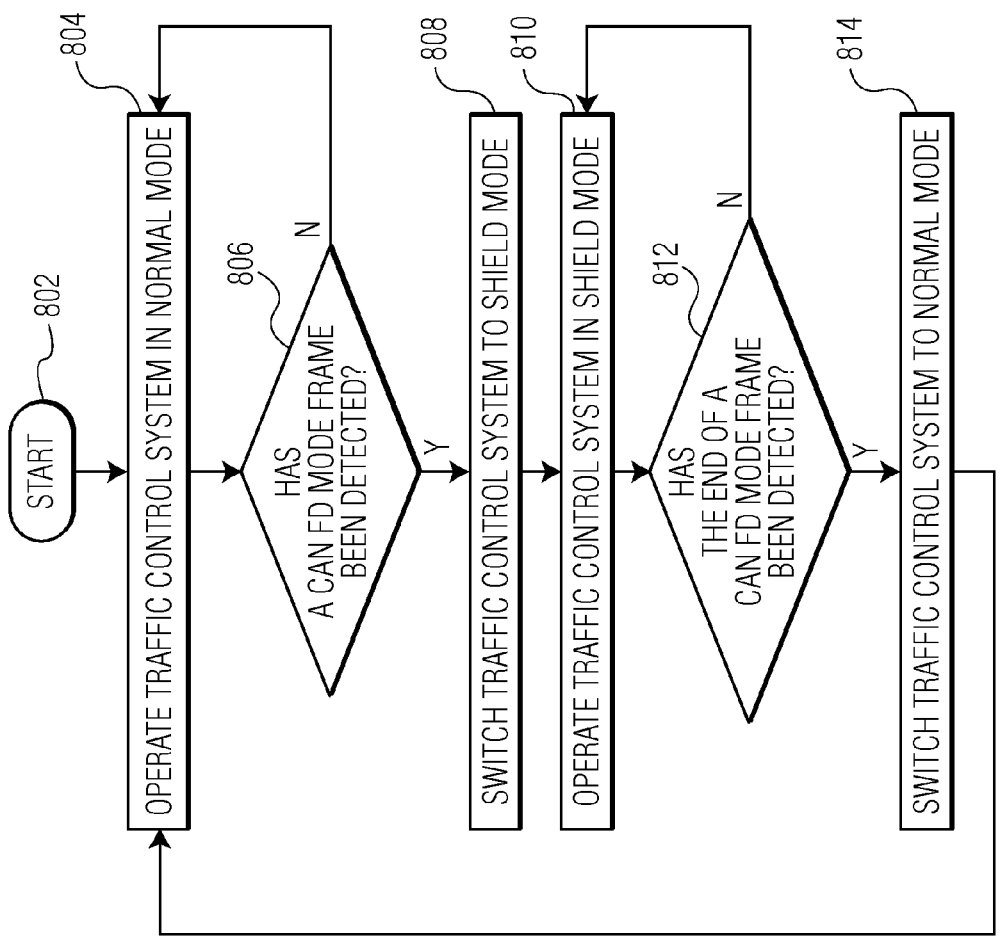
FIG. 8 is a process flow diagram of a technique for operating a traffic control system.

FIG. 8 is a process flow diagram of a technique for operating a traffic control system, such as the traffic control systems 250 and 350 described above. The process starts at start point 802, and continues to block 804, where the traffic control system operates in normal mode. For example, in normal mode, the traffic control system operates as described above with reference to FIG. 7A. At decision point 806, it is determined whether or not a CAN FD mode frame has been detected. In an embodiment, a CAN FD mode frame is detected by reading the state of the FDF bit. Table 1 provides an example of the decoding logic used to detect a CAN FD mode frame.

TABLE 1

| Case | FDF bit | res bit | Resulting operation mode | Comments |
|------|---------|---------|--------------------------|----------|
| 1 | 0 | n/a | normal mode | CAN classic mode frame |
| 2 | 1 | 0 | shield mode | CAN FD mode frame |
| 3 | 1 | 1 | normal mode | neither CAN classic or CAN FD mode frame |

If a CAN FD mode frame has not been detected, the process returns to block 804 and the traffic control system continues to operate in normal mode. However, if a CAN FD mode frame is detected, then, at block 808, the traffic control system is switched to shield mode and at block 810, the traffic control system operates in shield mode. For example, in shield mode, the traffic control system operates as described above with reference to FIG. 7B. When RXD is clamped dominant (e.g., logical low) by the traffic control system as illustrated in FIG. 7B, after six consecutive dominant bits a classic CAN protocol controller at an ECU is forced to send an error flag. Further, ISO 11898-1 specifies that "After sending an error [or overload] flag, each node shall . . . monitor the bus until it detects a recessive bit." Accordingly, switching the traffic control system to shield mode causes a classic CAN protocol controller at an ECU to wait until a CAN FD frame ends, effectively "pausing" the classic CAN protocol controller during a CAN FD frame transmission in the CAN network.

At decision point 812, a decision is made at to whether or not the end of a CAN FD mode frame has been detected. In an embodiment, the end of a CAN FD mode frame is detected upon detection of the Acknowledge bit (which is expected to be dominant and which occurs at after the CRC delimiter). If the end of a CAN FD mode frame has not been detected, then the process returns to block 810 and the traffic control system continues to operate in shield mode. However, if the end of a CAN FD mode frame is detected, then, at block 814, the traffic control system is switched to normal mode and the process returns to block 804 and the traffic control system operates in normal mode. As illustrated above with reference to FIG. 7A, switching the traffic control system back to normal mode releases RXD back to the actual CAN bus signal. Because RXD reflects the actual CAN bus signal, a classic CAN protocol controller and CAN FD controllers in the CAN network reach the "intermission slot" (see ISO 11898-1, section on "Specification of inter-frame space") at the same point in time, thus allowing the CAN protocol controllers to arbitrate amongst each other for the next frame transmission.

Although the traffic control system is typically switched from shield mode to normal mode upon detection of the end of a CAN FD mode frame, there may be some cases when the switch between modes takes into account other factors. In an embodiment, if TXD at the TXD interface 342 is dominant when the end of a CAN FD frame is detected, then the traffic control system 350 is not switched back to normal mode until TXD is recessive so as to prevent invalidating the CAN FD frame, which could be caused by the classic CAN protocol controller sending an error flag that interferes with the end of frame field.

In another embodiment, the traffic control system 350 leaves shield mode if an error flag is detected on the CAN bus 304. In such a case, it is not necessarily a problem if the classic CAN protocol controller at an ECU is not error passive yet. This may cause the classic CAN protocol controller to contribute to the bus error scenario and may lengthen that scenario for a few bit times. After an error flag, all nodes in the CAN network are in sync again.

In another embodiment, the traffic control system leaves shield mode when an idle is detected on the CAN bus and TXD from the CAN protocol controller is recessive (e.g., high). This approach causes the system to return to normal operation when, for example, a sender of a CAN FD frame suddenly stops in the middle of a frame transmission (e.g., "dies" during frame transmission).

Figure 9:
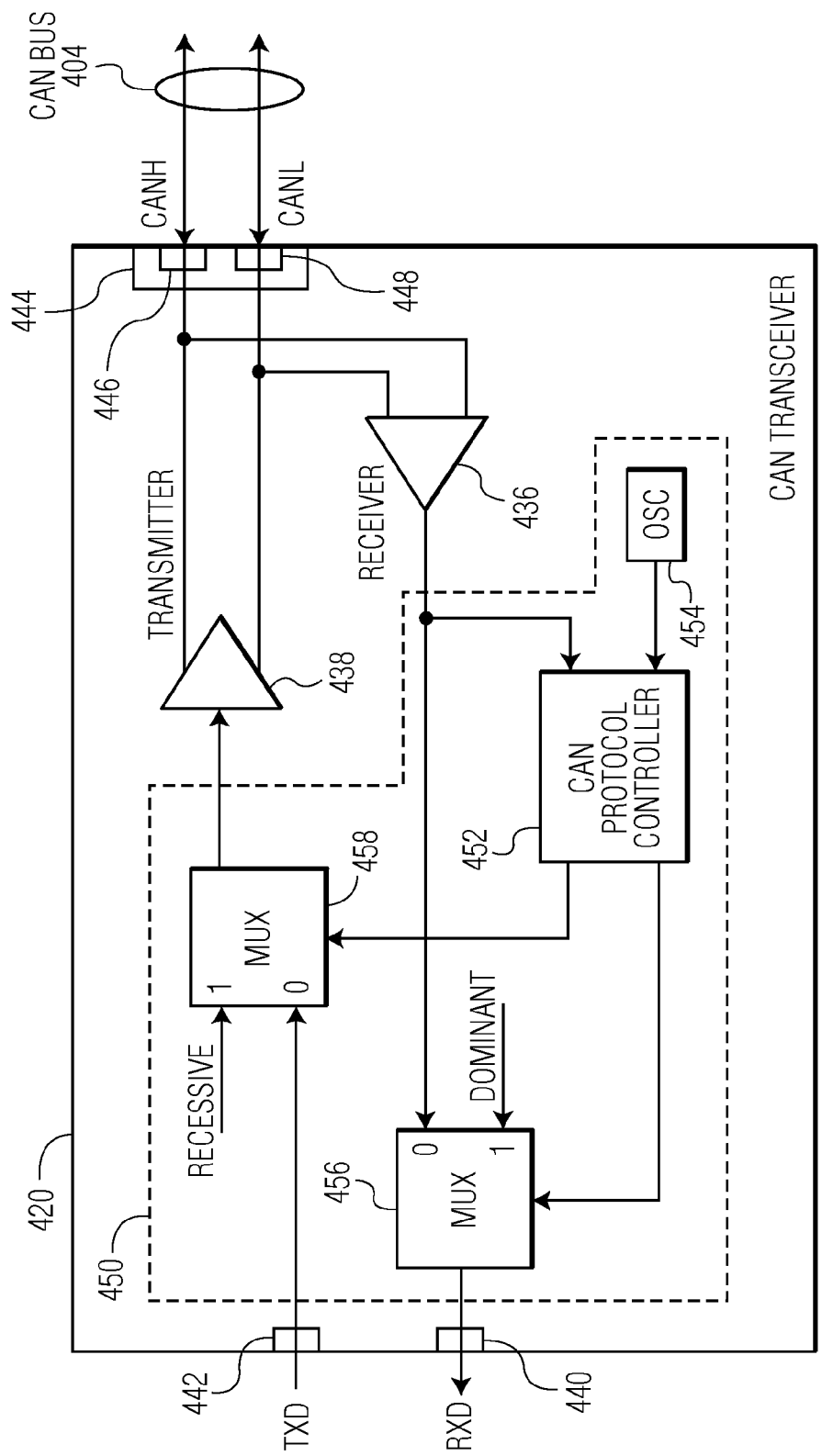
FIG. 9 depicts another embodiment of a CAN transceiver.

FIG. 9 depicts another embodiment of a CAN transceiver 420 that is similar to the CAN transceiver 220 from FIG. 5A. The CAN transceiver includes an RXD interface 440, a TXD interface 442, a CAN bus interface 444 (having a CANH bus interface 446 and a CANL bus interface 448), a receiver 436, a transmitter 438, and a traffic control system 450 that includes its own CAN protocol controller 452 (which is able to decode CAN FD frames) and a switching system (which includes a receive path multiplexer 456 and a transmit path multiplexer 458) that allows the TXD interface and the RXD interface to be independently disconnected from the CAN bus interface, thereby disconnecting a CAN protocol controller 114 at an ECU 102 from the CAN bus 404. In the embodiment of FIG. 9, the traffic control system includes the CAN protocol controller 452, an oscillator 454, the receive path multiplexer 456, and the transmit path multiplexer 258. The CAN protocol controller 452 is connected to output multiplexer control signals to the receive path multiplexer and/or to the transmit path multiplexer. The receive path multiplexer 456 is connected to receive serial digital data directly from the receiver and to output serial digital data to the RXD interface based on the state of the multiplexer control signal. In the embodiment of FIG. 9, the receive path multiplexer 456 is configured to output either RXD from the receiver 436 (state "0") or a clamped dominant RXD (state "1") depending on the state of the multiplexer. The transmit path multiplexer 458 is connected to receive serial digital data from the TXD interface 424 and to output serial digital data to the transmitter 438 based on the state of the multiplexer control signal. In the embodiment of FIG. 9, the transmit path multiplexer 458 is configured to output either TXD from the TXD interface 424 (state "0") or a clamped recessive TXD (state "1") depending on the state of the multiplexer.

In an embodiment, the CAN protocol controllers 252, 352, and 452 (also referred to as shield protocol controllers) are compliant with ISO 11898-1 WD (version including CAN FD). In an embodiment, the CAN protocol controller is able to receive data compliant with ISO 11898-1 WD but is not configured to transmit CAN protocol frames.

In the embodiments described above with reference to FIGS. 5A-5D, 7A, 7B, and 9, the traffic control systems 250, 350, and 450, respectively, are integrated onto the same device as the CAN transceivers. For example, the traffic control system is formed on the same integrated circuit (IC) device as the CAN transceiver (e.g., the traffic control system and CAN transceiver are fabricated on the same semiconductor substrate). In another embodiment, the traffic control system is formed on a separate IC device that is meant to be installed between an ECU 102 and its corresponding CAN transceiver 120.

Figure 10:
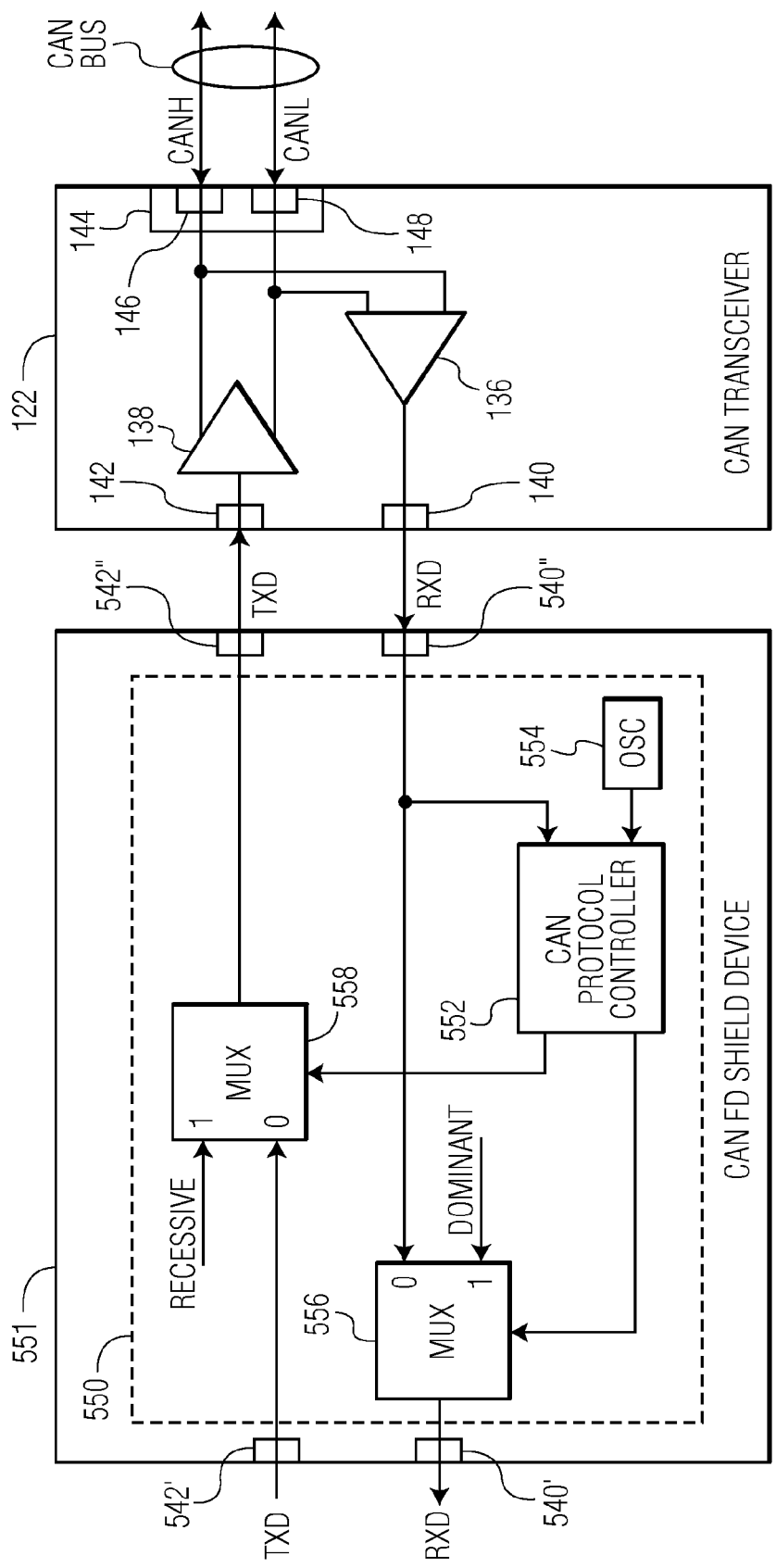
FIG. 10 depicts an embodiment of a CAN transceiver and a CAN FD shield device in which the CAN FD shield device is formed on an IC device that is separate from the CAN transceiver.

FIG. 10 depicts an embodiment of a CAN transceiver 122 and a CAN FD shield device 551 in which the CAN FD shield device is formed on an IC device that is separate from the CAN transceiver. In the embodiment of FIG. 10, the CAN transceiver 122 is a conventional CAN transceiver as described with reference to FIG. 4 and the CAN FD shield device 551 includes the traffic control system 550 as described above with reference to FIGS. 5A-5D, 7A, 7B, and/or 9. The CAN FD shield device 551 also includes a TXD input interface 542', a TXD output interface 542", an RXD input interface 540", and an RXD output interface 540'. As shown in FIG. 10, the CAN FD shield device 551 is connected to the CAN transceiver 122 via the TXD output interface 542" and the TXD interface 142 and via the RXD input interface 540" and the RXD interface 140. Although not shown in FIG. 10, in a CAN network, the CAN FD shield device 551 would be connected to an ECU 102 via the TXD input interface 542' and the RXD output interface 540'. Providing the traffic control system 550 in a separate CAN FD shield device 551 provides an efficient way to retrofit a CAN network by installing a CAN FD shield device between a CAN transceiver and an ECU without having to change or replace the CAN transceiver 122 or the ECU 102. Retrofitting a CAN network in such a way can allow concurrent operation of classic CAN and CAN FD devices on the same CAN network.

The above-described techniques enable microcontrollers that use the CAN normal (or "classic") mode to coexist with microcontrollers that use the CAN FD mode in a way that all ECUs are fully functional during normal operation of the CAN, e.g., during normal operation of an automobile. Additionally, the above-described techniques can be installed in to CANs of, for example, automobiles by simply equipping the normal mode ECUs with CAN transceivers or CAN shield devices as described above with reference to FIGS. 5A-10. No software updates to the microcontrollers or replacement microcontrollers are needed to enable the different microcontrollers (using different CAN modes) to coexist on the same CAN bus.

In an embodiment, the oscillator 254, 354, 454, 554 can be internal or external to the CAN FD shield device, the traffic control system, and/or the CAN transceiver.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A Controller Area Network (CAN) device comprising:
a transmit data (TXD) input interface;
a TXD output interface;
a receive data (RXD) input interface;
an RXD output interface;
a traffic control system connected between the TXD input and output interfaces and between the RXD input and output interfaces, and configured to:
detect the presence of CAN Flexible Data-rate (FD) traffic on the RXD input interface; and
if the traffic control system detects the presence of CAN FD traffic on the RXD input interface, disconnect the RXD input interface from the RXD output interface and disconnect the TXD input interface from the TXD output interface and output a dominant RXD on the RXD output interface.

2. The CAN device of claim 1, wherein the traffic control system is further configured to output a recessive TXD on the TXD output interface when the TXD input interface is disconnected from the TXD output interface.

3. The CAN device of claim 1, wherein the traffic control system is further configured to: output a dominant RXD on the RXD output interface when the RXD input interface is disconnected from the RXD output interface; and output a recessive TXD on the TXD output interface when the TXD input interface is disconnected from the TXD output interface.

4. The CAN device of claim 1, wherein the traffic control system is further configured to reconnect the RXD input interface to the RXD output interface and reconnect the TXD input interface from the TXD output interface after detecting the end of a CAN FD mode frame.

5. The CAN device of claim 4, wherein the traffic control system delays reconnecting the RXD input interface to the RXD output interface and delays reconnecting the TXD input interface to the TXD output interface as long as the TXD at the TXD input interface is dominant.

6. The CAN device of claim 1, wherein the traffic control system is further configured to reconnect the RXD input interface to the RXD output interface and reconnect the TXD input interface from the TXD output interface after detecting six consecutive equal bits on the RXD input interface.

7. The CAN device of claim 1, wherein the traffic control system comprises a CAN protocol controller configured to decode CAN FD traffic received on the RXD input interface.

8. The CAN device of claim 1, wherein the traffic control system further comprises a transmit path multiplexer configured to direct traffic from the TXD input interface to the TXD output interface depending on whether or not CAN FD traffic is detected.

9. The CAN device of claim 1, wherein the traffic control system further comprises a receive path multiplexer configured to direct traffic from the RXD input interface to the RXD output interface depending on whether or not CAN FD traffic is detected.

10. A CAN transceiver device comprising a transmitter, a receiver, and a CAN bus interface, the CAN transceiver further comprising the CAN device of claim 1.

11. A method for controlling Controller Area Network (CAN) traffic, the method comprising:
   decoding traffic received on an receive data (RXD) input interface;
   monitoring the decoded traffic for the presence of CAN Flexible Data-rate (FD) traffic; and
   if the presence of CAN FD traffic is detected on the RXD input interface, then disconnecting the RXD input interface from an RXD output interface and disconnecting a transmit data (TXD) input interface from a TXD output interface and outputting a dominant RXD on the RXD output interface.

12. The method of claim 11, further comprising outputting a recessive TXD on the TXD output interface when the TXD input interface is disconnected from the TXD output interface.

13. The method of claim 11, further comprising: outputting a dominant RXD on the RXD output interface when the RXD input interface is disconnected from the RXD output interface; and outputting a recessive TXD on the TXD output interface when the TXD input interface is disconnected from the TXD output interface.

14. The method of claim 13, further comprising reconnecting the RXD input interface to the RXD output interface and reconnecting the TXD input interface to the TXD output interface after detecting the end of a CAN FD mode frame.

15. The method of claim 14, further comprising delaying reconnecting the RXD input interface to the RXD output interface and delaying reconnecting the TXD input interface to the TXD output interface as long as the TXD at the TXD input interface is dominant.

16. The method of claim 13, further comprising reconnecting the RXD input interface to the RXD output interface and reconnecting the TXD input interface to the TXD output interface after detecting six consecutive equal bits on the RXD input interface.

\* \* \* \* \*